Nov. 24, 1970   L. H. O'BRIEN ET AL   3,543,135
MICROWAVE TO ELECTRICAL ENERGY CONVERTER UTILIZING
MULTIPACTOR DISCHARGE BETWEEN DIFFERING
SECONDARY ELECTRON EMISSIVE SURFACES
Filed Dec. 9, 1964                       2 Sheets-Sheet 1

INVENTORS.
LAWRENCE H. O'BRIEN,
JOSEPH BURNSWEIG JR.,
BY
Paul M. Coble

ATTORNEY.

INVENTORS.
LAWRENCE H. O'BRIEN,
JOSEPH BURNSWEIG JR.,
BY Paul M. Coffee
ATTORNEY.

United States Patent Office 3,543,135
Patented Nov. 24, 1970

3,543,135
MICROWAVE TO ELECTRICAL ENERGY CONVERTER UTILIZING MULTIPACTOR DISCHARGE BETWEEN DIFFERING SECONDARY ELECTRON EMISSIVE SURFACES
Lawrence H. O'Brien and Joseph Burnsweig, Jr., Los Angeles, Calif., assignors to Hughes Aircraft Company, Culver City, Calif., a corporation of Delaware
Filed Dec. 9, 1964, Ser. No. 417,186
Int. Cl. H02m 7/00; H01j 43/00; H01p 7/06
U.S. Cl. 321—8   12 Claims

ABSTRACT OF THE DISCLOSURE

In the disclosed energy converter input microwave energy establishes a multipactor discharge between a pair of spaced secondary electron emissive surfaces having secondary electron emission coefficients different from one another. The resultant net transfer of electrons from the larger coefficient surface to the smaller coefficient surface produces a DC electrical potential between the surfaces.

---

This invention relates to energy conversion, and more particularly relates to a device for directly converting radio frequency electromagnetic wave energy into direct current electrical energy.

The recent increased interest in space technology has led to the design of advanced space vehicles with elaborate guidance systems and measuring instruments. In order to provide the energy necessary to operate the space vehicle instrumentation, either an electrical power source must be provided in the space vehicle, or energy must be supplied to the space vehicle from an external source. Since a premium is placed on minimizing the size and weight of apparatus carried in the space vehicle, and any vehicle-located source failure must be avoided, the external source approach is sometimes preferred. Thus, in order to supply the necessary power to the space vehicle, energy is generated at a ground based station and is transmitted to the space vehicle in the form of electromagnetic waves. An energy converter located in the space vehicle transforms the electromagnetic wave energy received by the space vehicle into electrical energy for operating the vehicle's measuring and control systems.

In the past, energy converters for space vehicles have employed photovoltaic cells, photodiodes, and thermoelectric devices. Although the conversion efficiencies achievable with some of these devices are satisfactory at low frequencies, when the frequency of operation is increased to the microwave range, i.e., at frequencies over 1000 mc., a substantial reduction in conversion efficiency occurs. This reduced efficiency is due to inherent limitations in prior art energy converters such as recovery speed and increasing leakage between effective capacitor plates as a function of frequency.

Accordingly, it is an object of the present invention to provide a device for converting microwave energy into electrical energy with greater conversion efficiency than has been possible in the prior art.

It is a further object of the present invention to provide a power converter which directly converts electromagnetic waves into electrical energy without employing thermoelectric or photovoltaic effects.

It is a still further object of the present invention to provide an electromagnetic wave to DC energy converter which is operable with electromagnetic waves of higher frequencies than in the past.

It is still another object of the present invention to provide a simple, compact and reliable device for efficiently converting electromagnetic wave energy into direct current electrical energy, with thermal energy also being readily obtainable if desired.

These and other objects are achieved by the present invention through the use of a secondary electron resonance phenomenon, termed "multipactor," which results from the application of a radio frequency electric field to an evacuated chamber including a pair of spaced opposing surfaces each having a secondary electron emission coefficient greater than unity. If the radio frequency electric field is of sufficient amplitude and if the frequency of the electric field is properly synchronized with the surface spacing, electrons will be emitted from one surface and accelerated toward the opposite surface where they will arrive when the electric field reverses its polarity. Secondary electrons will be emitted from the opposite surface, and on account of the greater than unity secondary emission coefficient more electrons will be emitted from the opposite surface than impinged upon it. Since the electric field reverses its polarity as the secondary electrons are emitted, these secondary electrons will be accelerated back to the first surface from which they will release secondary electrons coincident in time with another polarity reversal of the electric field. Thus, the process continues as electrons are accelerated back and forth between the surfaces in time synchronization with the alternating electric field. The net result is to establish multipactor action, i.e. electron multiplication between a pair of secondary electron emissive surfaces by means of a time synchronous alternating electric field.

In accordance with the present invention a multipactor device is provided in which the spaced secondary electron emissive surfaces have different secondary electron emission coefficients and are electrically insulated from one another. Means are provided for applying to the device an electromagnetic wave capable of establishing multipactor action between the secondary electron emissive surfaces. Since more electrons are emitted from the surface having the greater secondary electron emission coefficient than from the surface having the smaller coefficient, a net transfer of electrons to the smaller coefficient surface occurs, thereby producing a DC electrical potential between the surfaces.

Other and further objects, advantages, and characteristic features of the present invention will become readily apparent from the following detailed description of preferred embodiments of the invention when taken in conjunction with the accompanying drawings in which.

Figure 1:
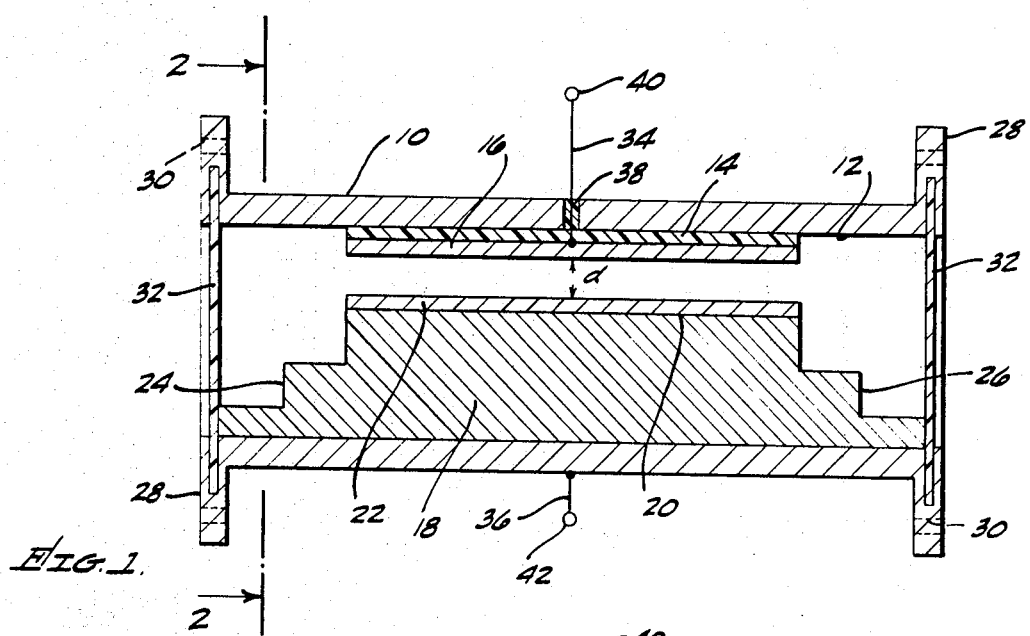
FIG. 1 is a longitudinal sectional view illustrating an energy converter according to one embodiment of the present invention.
Figure 2:
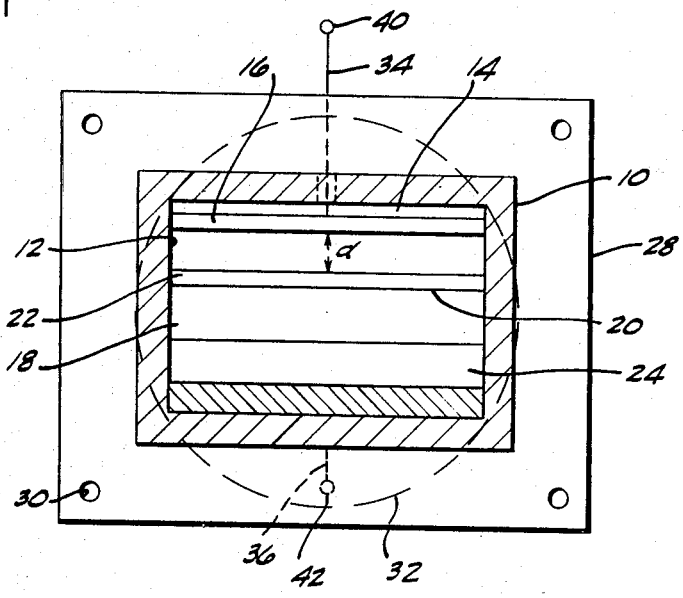
FIG. 2 is a cross-sectional view taken along line 2—2 of FIG. 1.

Referring to the drawings with greater particularity, and especially to FIGS. 1 and 2, an energy converting device in accordance with one embodiment of the present invention may be seen to include a metal housing 10, of copper for example, which defines a rectangular waveguiding passageway 12 capable of propagating electromagnetic waves within a predetermined frequency range. The housing 10 may be a standard rectangular waveguide at X-Band frequencies such as an RG–52/U or an RG–51/U waveguide, for example. A portion of one of the broad walls of the waveguide 12 is provided with a layer 14 of electrically insulating material such as ceramic. Coextensively disposed on the insulating layer 14 is a layer 16 of a secondary electron emissive material, i.e., a material having a secondary electron emission coefficient δ greater than unity. Examples of suitable materials which may be used for the secondary emissive layer 16 are copper; a copper-beryllium alloy consisting of approximately 98% copper and 2% beryllium; and a silver-magnesium alloy containing approximately 98.5% silver, 1.3% magnesium and 0.2% impurities.

A block 18 of electrically conductive material such as copper is disposed along the broad wall of the waveguide 12 opposite to the wall provided with the layers 14 and 16. The block 18 has a central portion of maximum height which defines a surface 20 disposed parallel to and coextensive with the layer 16, and which surface is covered with a layer 22 of secondary electron emissive material. The distance between the secondary electron emissive layers 16 and 22 is designated by "$d$" and may be of a value essentially between .020 and .060 inch when the aforementioned X-Band waveguides are employed. In order to sustain multipactor action in the region between the surfaces 16 and 22 the distance "$d$" must be related to the frequency of the alternating electric field in the waveguide 12 in the manner to be described later.

The layer 22 may consist of one of the materials mentioned above with respect to the secondary electron emissive layer 16; however, in accordance with the principles of the present invention the material for the layer 22 must afford a secondary electron emission coefficient different from that of the material used for the layer 16. As an illustrative example, the layer 16 may be of the aforementioned copper-beryllium alloy, and the layer 22 may be of the aforementioned silver-magnesium alloy. The copper-beryllium alloy has a secondary electron emission coefficient of 1.3, while the silver-magnesium alloy possesses a secondary electron emission coefficient of 9.8, thereby satisfying the aforestated condition that the two surfaces possess different secondary electron emission coefficients. In should be understood, of course that materials other than those specified herein may be employed, so long as the different secondary emission coefficient condition is satisfied.

The electrically conductive block 18 further defines a pair of portions 24 and 26 at axial ends thereof which provide stepwise height transitions between the waveguide wall on which the block 18 is mounted and the central surface 20 which contains the secondary electron emissive layer 22. The stepped portions 24 and 26 function as impedance transformers for matching the impedance of the narrower waveguiding passageway between the surfaces 16 and 22 with that of the wider waveguiding passageways at the ends of the waveguide 12 in order to minimize the reflection of electromagnetic wave energy in the waveguide 12.

Each end of the housing 10 is provided with a coupling flange 28 for use in coupling to an external waveguide or other transmission line (not shown). Holes 30 (see FIG. 2) may be provided in the corners of the coupling flange 28 to receive bolts or screws for attaching the flange 28 to the external waveguiding circuitry. A circular disk 32 of a dielectric material such as forsterite or alumina is disposed across the waveguide 12 adjacent each of the flanges 28. Each disk 32 is disposed in a slot in the associated flange portion 28 and is hermetically sealed to the flange 28 so that each disk 32 is able to function as a vacuum window which enables the interior portions of housing 10 to be maintained at a reduced pressure, for example $5 \times 10^{-7}$ torr. At the same time, electromagnetic waves are able to pass freely into and out of the waveguide 12 through the disks 32, with the end of the waveguide 12 containing one of the disks 32 serving as an input port for electromagnetic wave energy to be converted into electrical energy, and the opposite end of the waveguide 12 functioning as an output port for the small amount of leakage electromagnetic wave energy which is not converted into electrical energy.

In order to obtain output electrical energy from the device a first conductor 34, which extends through a hole in the housing 10 and the insulating layer 14, is electrically connected to the layer 16, for example by brazing; while a second conductor 36, which is attached to the housing 10, affords electrical connection with the layer 22 via the block 18. A sleeve 38 of electrically insulating material is disposed about the conductor 34 to insulate it from the housing 10. Terminals 40 and 42, from which the output DC electrical potential may be obtained, are connected to the conductors 34 and 36, respectively.

Figure 3:
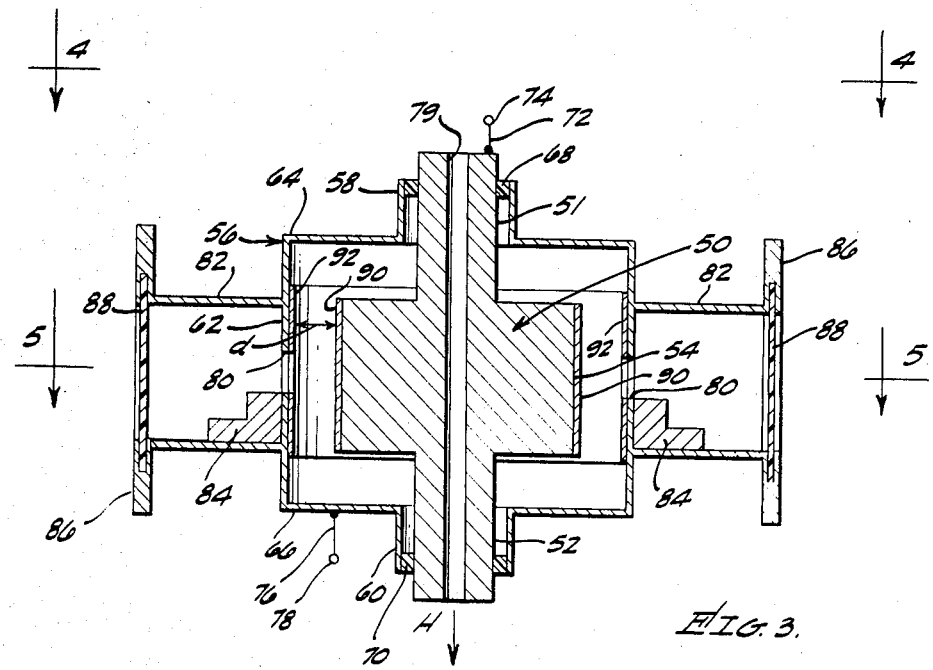
FIG. 3 is a longitudinal sectional view illustrating an energy converter according to another embodiment of the present invention.
Figure 4:
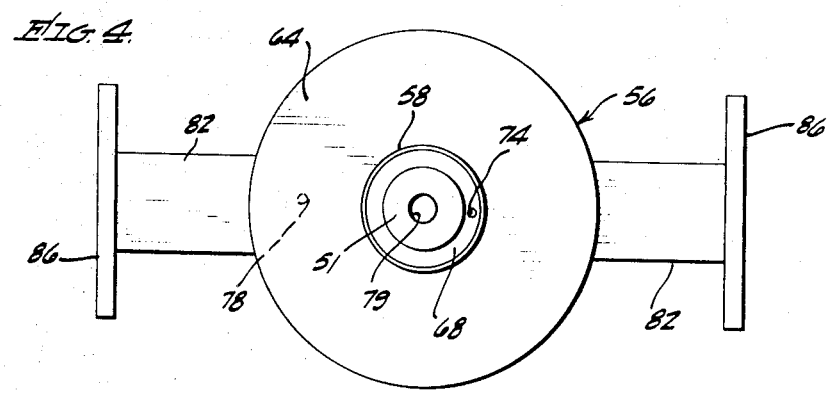
FIG. 4 is an end view of the energy converter of FIG. 3 as seen from line 4—4.
Figure 5:
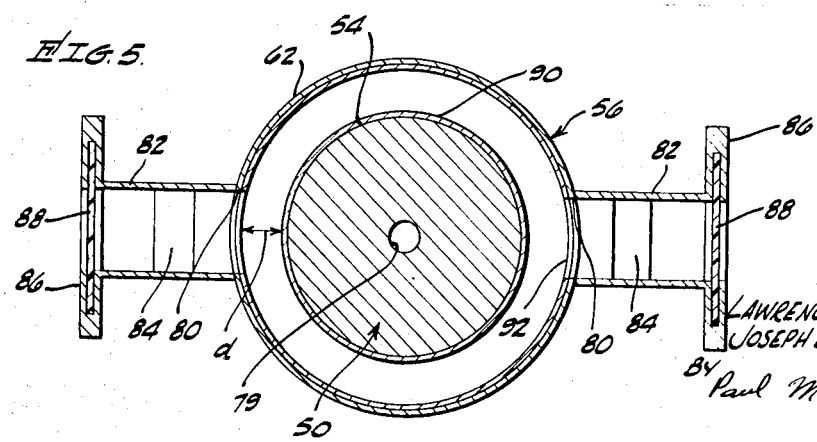
FIG. 5 is a cross-sectional view taken along line 5—5 of FIG. 3.

In another embodiment of the present invention, illustrated in FIGS. 3–5, the energy converting device is constructed with an annular waveguiding passageway in which multipactor action occurs. In this embodiment a centrally disposed electrically conductive cylindrical element 50 defines a pair of axial end portions 51 and 52 of a preselected diameter and an axially intermediate portion 54 of a diameter greater than the preselected diameter. An electrically conductive cylindrical shell 56 is coaxially disposed about the cylindrical element 50. The shell 56 possesses a pair of tubular axial end portions 58 and 60 of a diameter greater than the diameter of the element end portions 51 and 52 but less than the diameter of the intermediate portion 54 of the element 50. The shell 56 also has an intermediate tubular portion 62 of a diameter greater than the diameter of the element intermediate portion 54 and of an axial extent greater than the axial extent of the portion 54. The shell 56 further defines a pair of radially extending portions 64 and 66 which respectively interconnect its end portions 58 and 60 with the respective ends of its intermediate portion 62.

A ceramic ring 68 is disposed between the end portion 51 of the element 50 and the end portion 58 of the shell 56 to electrically insulate the portions 51 and 58 from one another. Similarly, at the opposite end of the device the end portions 52 and 60 are separated by an electrically insulating ceramic ring 70. The opposing walls of the portions 51 and 58, together with the ring 68 (as well as the walls 52 and 60 and ring 70), function as a radio frequency choke joint which minimizes the leakage of radio frequency electromagnetic wave energy from the device. An electrical conductor 72 provided with a terminal 74 is connected to the cylindrical element 50, while an electrical conductor 76 having a terminal 78 is connected to the shell 56. The terminals 74 and 78 provide the output DC electrical potential from the device of FIGS. 3–5. An axially extending cylindrical bore hole 79 may be provided in the element 50 so that a suitable coolant such as water may be passed through the device to increase its thermal capability and thereby achieve higher power operation.

The axial intermediate portion 62 of the shell 56 defines a pair of apertures, or ports, 80 at diametrically opposite locations along its surface. A rectangular waveguide 82 extends radially outwardly from each portion of the shell 56 surrounding one of the ports 80. A stepped impedance transforming element 84 is disposed in each waveguide 82 adjacent the outer wall of the shell portion 62 in order to match the impedance of the waveguides 82 with that of the annular waveguiding structure defined by the shell 56 and the element 50 and thereby minimize electromagnetic wave reflection.

The outer end of each radially extending waveguide 82 is provided with a rectangular coupling flange 86 for use in coupling to external waveguiding circuitry. An electromagnetic wave permeable gas-tight window element 88 is hermetically sealed to each waveguide 82 in its flange region 86. Input electromagnetic waves to be converted into electrical energy are applied to the outer end of one of the waveguides 82, while the small amount of leakage electromagnetic wave energy which is not converted into electrical energy is removed from the outer end of the other waveguide 82.

A coating 90 of a secondary electron emissive material is disposed along the lateral surface of the intermediate portion 54 of the cylindrical element 50, and a coating 92 of a secondary electron emissive material is disposed along the inner lateral surface of the intermediate portion 62 of the shell 56. The coating 92 may be axially coextensive with the coating 90 or, as shown, extend in an axial direction slightly beyond the ends of the coating 90. The coatings 90 and 92 may be of the materials mentioned above with respect to the coatings 16 and 22 in the embodiment of FIGS. 1-2; however, in accordance with the principles of the present invention the coatings 90 and 92 must possess different secondary electron emission coefficients. The radial distance between the coatings 90 and 92 is depicted as "$d$" in FIGS. 3 and 5.

In the embodiment of FIGS. 3-5 an external magnet (omitted from the drawing for simplicity) should be provided to establish a magnetic field H in a direction parallel to the longitudinal axis of the energy converter. The resultant crossed field interaction between the magnetic field H and the radial electric field E results in an electron trajectory which curves in a plane perpendicular to the magnetic field. Such a curvature causes electrons to impinge upon the secondary electron emissive surfaces with a low grazing angle, thereby increasing the number of secondary electrons emitted by a factor of from two to four.

In order to gain a better understanding of the present invention, the following mathematical analysis is included setting forth parameter relationships necessary to commence and sustain multipactor action, and which relationships may be employed in designing an energy converting device in accordance with the invention. While the analysis is directed to a device having the configuration illustrated in FIGS. 1-2, a similar mathematical analysis is possible for the configuration of FIGS. 3-5. The present analysis assumes that an electric field intensity E is established between the secondary electron emissive surfaces 16 and 22 in a direction perpendicular to the surfaces 16 and 22, i.e. along the direction of the surface spacing $d$ in FIGS. 1 and 2. It is further assumed that electron motion occurs entirely along the aforementioned direction of the E field, and which direction shall be referred to as the $x$-direction.

From classical dynamics the force F on an electron subjected to the foregoing environment is given by:

$$F = qE \quad (1)$$

where $q$ is the electronic charge and E is the electric field intensity. Using Newton's Second Law, Equation 1 can be rewritten as:

$$\frac{d^2x}{dt^2} = \frac{qE}{m} \quad (2)$$

where $m$ is the mass of an electron. Assuming a sinusoidal variation in E, Equation 2 becomes:

$$\frac{d^2x}{dt^2} = \frac{qE_0}{m} \sin \omega t \quad (3)$$

where $E_0$ is the maximum amplitude and $\omega$ is the frequency of the electric field E. Integration of Equation 3 yields:

$$\frac{dx}{dt} = \frac{-q}{m\omega} E_0 \cos \omega t + K_1 \quad (4)$$

Assuming zero initial electron velocity, $$K_1 = \frac{qE_0}{m\omega} \quad (5)$$

Therefore, Equation 4 becomes:

$$\frac{dx}{dt} = \frac{qE_0}{m\omega} (1 - \cos \omega t) \quad (6)$$

Integrating Equation 6 gives:

$$x = \frac{qE_0}{m\omega} \left( t - \frac{\sin \omega t}{\omega} \right) + K_2 \quad (7)$$

If $x=0$ at $t=0$, $K_2=0$ and Equation 7 becomes:

$$x = \frac{qE_0}{m\omega} \left( t - \frac{\sin \omega t}{\omega} \right) \quad (8)$$

Since the alternating voltage between the surfaces 16 and 22 is proportional to the electric field times the surface separation, i.e., $V=Ed$, Equation 8 may be rewritten as:

$$x = \frac{qV_0}{m\omega d} \left( t - \frac{\sin \omega t}{\omega} \right) \quad (9)$$

where $V_0$ is the amplitude of the alternating voltage and $d$ is the surface spacing.

As has been mentioned above, proper time synchronization between the electrons and the electric field requires that the transit time for the electrons to traverse the distance $d$ between the surfaces 16 and 22 should be equal to an odd multiple of a half cycle of the electric field. Expressed mathematically, the transit time $t$ must be:

$$t = \frac{(2n-1)}{2f} = (2n-1) \frac{\pi}{\omega} \quad (10)$$

where the electric field has a frequency $f = \omega 2/\pi$ and where $n$ is any integer. It should be pointed out, however, that multipactor action will still occur even though the electron transit times are not exactly equal to $(2n-1)$ half cycles and even if the electrons are slightly out of phase at the beginning of the cycle.

Substituting Equation 10 into Equation 6, the electron velocity when $x=d$ becomes:

$$\left.\frac{dx}{dt}\right|_{x=d} = \frac{qV_0}{\pi m f d} \quad (11)$$

Similarly, substituting Equation 10 into Equation 9 and letting $x=d$ yields:

$$d^2 = \frac{qV_0(2-1)}{4\pi m f^2} \quad (12)$$

Thus, for multipactor action to occur the spacing $d$ between the secondary electron emissive surfaces 16 and 22 must be related to the alternating voltage amplitude $V_0$ and the frequency $f$ of the electric field as set forth in Equation 12.

A further condition necessary to sustain multipactor action is that the primary electrons must achieve at least a minimum amount of kinetic energy necessary to liberate secondary electrons with the desired secondary emission coefficient. Assuming an electron starts from rest on one of the surfaces 16 or 22, the energy U which it gains in transversing the gap $d$ may be determined from:

$$U = \frac{1}{2} mv^2 \quad (13)$$

where $v$ is the velocity of the electron upon reaching the opposite surface. Since the velocity $v$ may be determined from Equation 11, substitution of Equation 11 into Equation 13 yields:

$$U = \frac{1}{2} m \left( \frac{qV_0}{\pi m f d} \right)^2 = \frac{2qV_0}{\pi} \left( \frac{qV_0}{4\pi m f^2 d^2} \right) \quad (14)$$

Solving Equation 12 for $V_0$, and substituting the result for the $V_0$ inside the parenthesis on the right side of the Equation 14 gives:

$$U = \frac{2qV_0}{\pi(2n-1)} \quad (15)$$

Converting to electron volts:

$$U = \frac{2V_0}{\pi(2n-1)} \text{ ev} \quad (16)$$

In the design of multipactor devices it has been found convenient to employ power level rather than stored energy as one of the design parameters. Since the power flow through any passive slow-wave structure equals the energy stored times the group velocity of the electromagnetic wave in the region of interest, the power flow is given by:

$$P = U v_g \quad (17)$$

where U is the stored energy and $v_g$ is the group velocity of the electromagnetic wave which may be determined from an $\omega$–$\beta$ diagram for the particular slow-wave structure in question. The energy stored in a device according to FIGS. 1 and 2 is given by:

$$U = \frac{1}{2} C V_o^2 \quad (18)$$

where C is the capacitance between the surfaces 16 and 22. C may be determined from:

$$C = \frac{\epsilon A}{d} \quad (19)$$

where $\epsilon$ is the dielectric constant of the material (air in this instance) between the secondary electron emissive surfaces, and A is the opposing area of the surfaces 16 and 22. Substituting Equation 19 into Equation 18, substituting the resultant equation into Equation 17, and solving for $V_0$ yields:

$$V_0 = \left(\frac{2Pd}{\epsilon A v_g}\right)^{1/2} \quad (20)$$

Substituting Equation 20 into Equation 12 gives:

$$d^{3/2} = \left(\frac{q}{m}\right) \frac{2n-1}{4\pi f^2} \left(\frac{2Pd}{\epsilon A v_g}\right)^{1/2} \quad (21)$$

and substitution of Equation 20 into Equation 16 results in:

$$U = \frac{2}{\pi(2n-1)} \left(\frac{2Pp}{\epsilon A v_g}\right)^{1/2} \text{ev.} \quad (22)$$

Equations 21 and 22 are useful in the design of an energy converter in accordance with the present invention. The power level of the input electromagnetic waves is one of the design parameters which is given. Since $v_g$ may be determined from an $\omega$–$\beta$ diagram, and A and $f$ determined in accordance with the particular waveguide selected, the surface spacing $d$ and the minimum energy U necessary to sustain multipactor action may be calculated. For optimum results it has been found that $n$ should equal either one or two, and U should vary between essentially 200 and 2000 electron volts depending upon the particular secondary electron emissive materials employed.

In the operation of an energy converter in accordance with the present invention, when an input electromagnetic wave of the proper frequency $f$ and power P to satisfy Equations 21 and 22 is applied to the input port of the energy converter, electrons are accelerated across the gap $d$ and emit secondary electrons which are in phase with the electric field so that a current is rapidly established between the surfaces 16 and 22. The current density is limited by space charge forces which shift some of the electrons out of synchronism with the electric field and thereby establish an equilibrium condition. Since one of the surfaces 16 and 22 has a secondary electron emission coefficient greater than the other surface, more electrons are emitted from the greater coefficient surface than from the surface having the smaller coefficient. Thus, a net transfer of electrons to the smaller coefficient surface occurs, producing a DC electrical potential between the surfaces 16 and 22, and hence between the output terminals 40 and 42.

By connecting a low resistance material between the output terminals 40 and 42, essentially a short circuit may be provided between these terminals so that a relatively large current is able to flow therebetween. Dissipation of this current in the resistive material results in power ($I^2R$) losses which may be used to provide output thermal energy from the converter of the present invention.

Although the present invention has been shown and described with reference to a particular embodiment, nevertheless, various changes and modifications obvious to one skilled in the art to which the invention pertains are deemed to lie within the spirit, scope and contemplation of the invention as set forth in the appended claims.

What is claimed is:

1. An energy converting device comprising: a waveguiding structure including at least a pair of spaced apart secondary electron emissive surfaces at least portions of which oppose one another, said surfaces having secondary electron emission coefficients different from one another and being electrically insulated from one another, means for applying to said waveguiding structure an electromagnetic wave capable of establishing multipactor action between said surfaces, and means coupled to said surfaces for obtaining electrical energy therefrom.

2. A device for converting electromagnetic wave energy into a DC electrical potential comprising: a waveguiding structure including at least a pair of spaced apart secondary electron emissive surfaces at least portions of which oppose one another, said surfaces having secondary electron emission coefficients different from one another and being electrically insulated from one another, means for applying to said waveguiding structure an electromagnetic wave capable of establishing multipactor action between said surfaces to provide a net transfer of electrons from the surface having the greater secondary electron emission coefficient to the surface having the smaller secondary electron emission coefficient, whereby a DC electrical potential is produced between said surfaces, and circuit means electrically connected to each of said surfaces for obtaining said DC electrical potential.

3. An energy converting device comprising: a waveguiding structure, means in said structure defining first and second secondary electron emissive surfaces spaced from and opposing one another, said first and second surfaces having secondary electron emission coefficients different from one another and being electrically insulated from one another, means for applying an electric field to said waveguiding structure at a frequency related to the spacing between said first and second surfaces so as to allow electron motion between said surfaces essentially in time synchronization with the electric field alternations, and means coupled to said first and second surfaces for obtaining electrical energy therefrom.

4. An energy converting device comprising: means for propagating an electromagnetic wave and including first and second opposing surfaces electrically insulated from one another and separated by a preselected distance, each of said surfaces having a secondary electron emission coefficient greater than unity, the secondary electron emission coefficient of said first surface being different from the secondary electron emission coefficient of said second surface, means for applying to said wave propagating means an electromagnetic wave of a frequency $f$, said frequency $f$ being related to said preselected distance so as to allow electrons to traverse said preselected distance in a time essentially equal to $$\frac{(2n-1)}{2f}$$

where $n$ is a positive integer, and means coupled to said first and second surfaces for obtaining electrical energy therefrom.

5. A device for converting electromagnetic wave energy into electrical energy comprising: a wave propagating structure including first and second surfaces spaced from one another by a preselected distance with at least portions of said surfaces opposing one another, said first and second surfaces being electrically insulated from one another, said first surface being of a first material having a secondary electron emission coefficient greater than unity, said second surface being of a second material having a secondary electron emission coefficient greater than unity and different from the secondary electron emission coefficient of said first material, means for applying to said structure an electromagnetic wave of a frequency $f$, said frequency $f$ being related to said preselected distance so as to allow electrons to traverse said preselected distance in a time essentially equal to $$\frac{(2n-1)}{2f}$$

where $n$ is a positive integer, a first electrical conductor electrically connected to said first surface, and a second electrical conductor electrically connected to said second surface.

6. A device according to claim 5 wherein said first material is a copper-beryllium alloy and said second material is a silver-magnesium alloy.

7. A device for converting electromagnetic wave energy into electrical energy comprising: means for propagating an electromagnetic wave and including first and second surfaces spaced from one another by a preselected distance with at least portions of said surfaces opposing one another, said first and second surfaces being electrically insulated from one another, each of said surfaces having a secondary electron emission coefficient greater than unity, the secondary electron emission coefficient of said first surface being different from the secondary electron emission coefficient of said second surface, said wave propagating means defining a first port at a first portion thereof and defining a second port at a second portion thereof, an electromagnetic wave permeable gastight window disposed in each of said ports, impedance matching transformer means disposed in the vicinity of each of said ports for minimizing reflection of electromagnetic wave energy, means for applying to said first port an electromagnetic wave of a frequency $f$, said frequency $f$ being related to said preselected distance so as to allow electrons to traverse said preselected distance in a time essentially equal to $$\frac{(2n-1)}{2f}$$

where $n$ is a positive integer, a first electrical conductor electrically connected to said first surface, and a second electrical conductor electrically connected to said second surface.

8. A device for converting electromagnetic wave energy into electrical energy comprising: a housing defining a rectangular waveguiding passageway having first and second parallel walls, a first coating of a material having a secondary electron emission coefficient greater than unity disposed on said first wall, a second coating of a material having a secondary electron emission coefficient greater than unity and different from the secondary electron emission coefficient of said first coating disposed on said second wall, said first and second coatings being electrically insulated from one another, means for applying to said waveguiding passageway an electromagnetic wave of a frequency $f$, said frequency $f$ being related to the distance separating said first and second coatings so as to allow electrons to traverse said distance in a time essentially equal to $$\frac{(2n-1)}{2f}$$

where $n$ is a positive integer, a first electrical conductor electrically connected to said first coating, and a second electrical conductor electrically connected to said second coating.

9. A device for converting electromagnetic wave energy into electrical energy comprising: a waveguiding structure capable of propagating electromagnetic waves within a predetermined frequency range between an input port and an output port, said waveguiding structure having first and second pairs of oppositely disposed parallel walls, a layer of insulating material disposed on one of the walls of said first pair, a first layer of a material having a secondary electron emission coefficient greater than unity disposed on said layer of insulating material, an electrically conductive element disposed on the other wall of said first pair and having a region lying opposite to said first layer, said region extending beyond the remainder of said element in step-wise fashion toward said first layer, a second layer of a material having a secondary electron emission coefficient greater than unity disposed on the surface of said extending region of said element facing said first layer, the secondary electron emission coefficient of the material of said second layer being different from the secondary electron emission coefficient of the material of said first layer, an electromagnetic wave permeable gas-tight window disposed in each of said ports, means for applying to said input port an electromagnetic wave of a frequency $f$, said frequency $f$ being related to the distance separating said first and second layers so as to allow electrons to traverse said distance in a time essentially equal to $$\frac{(2n-1)}{2f}$$

where $n$ is a positive integer, a first electrical conductor electrically connected to said first layer and electrically insulated from said one of said first pair of walls, and a second electrical conductor electrically connected to said other of said first pair of walls.

10. A device for converting electromagnetic wave energy into electrical energy comprising: an annular waveguiding structure including inner and outer coaxially disposed cylindrical walls, a first coating of a material having a secondary electron emission coefficient greater than unity disposed on said inner wall, a second coating of a material having a secondary electron emission coefficient greater than unity and different from the secondary electron emission coefficient of said first coating disposed on said outer wall, means for providing an axially extending magnetic field in said annular waveguiding structure, means for applying to said waveguiding structure an electromagnetic wave of a frequency $f$, said frequency $f$ being related to the radial distance separating said first and second coatings so as to allow electrons to traverse said distance in a time essentially equal to $$\frac{(2n-1)}{2f}$$

where $n$ is a positive integer, means for electrically insulating said inner wall from said outer wall, a first electrical conductor electrically connected to said inner wall, and a second electrical conductor electrically connected to said outer wall.

11. A device for converting electromagnetic wave energy into electrical energy comprising: an electrically conductive cylindrical element, an electrically conductive cylindrical shell having a diameter greater than the diameter of said cylindrical element coaxially disposed about said cylindrical element, radially extending wall means disposed between said element and said shell and including means for insulating said element from said shell, said shell defining first and second ports at diametrically opposite locations therealong, a waveguiding device extending radially outwardly from said shell at each of said ports, impedance matching transformer means in each of said waveguiding devices for minimizing reflection of electromagnetic wave energy, an electromagnetic wave permeable gas-tight window disposed in each of said waveguiding devices, a first coating of a material having a secondary electron emission coefficient greater than unity disposed along the lateral surface of said cylindrical element, a second coating of a material having a secondary electron emission coefficient greater than unity and different from the secondary electron emission coefficient of said first coating disposed along the inner lateral surface of said shell, means for providing a magnetic field in a direction parallel to the axis of said element and said shell, means for applying to one of said waveguiding devices an electromagnetic wave of a frequency $f$, said frequency $f$ being related to the radial distance separating said first and second coatings so as to allow electrons to traverse said distance in a time essentially equal to $$\frac{(2n-1)}{2f}$$

where $n$ is a positive integer, a first electrical conductor electrically connected to said element, and a second electrical conductor electrically connected to said shell.

12. A device for converting electromagnetic wave energy into electrical energy comprising: an electrically conductive cylindrical element having a pair of axial end portions of a first diameter and an axially intermediate portion of a second diameter greater than said first diameter, an electrically conductive cylindrical shell coaxially disposed about said element and having a pair of axial end portions of a third diameter greater than said first diameter and less than said second diameter and an axial intermediate portion of a fourth diameter greater than said second diameter, the axial extent of said intermediate portion of said shell being greater than that of said intermediate portion of said element, said shell further defining a pair of radially extending portions interconnecting respective ones of its end portions with respective ends of its intermediate portion, a ring of electrically insulating material disposed between each end portion of said element and the end portion of said shell disposed thereabout, said intermediate portion of said shell defining first and second ports at diametrically opposite locations therealong, a waveguide extending radially outwardly from the portions of said shell surrounding each of said ports, impedance matching transformer means in each of said waveguides for minimizing reflection of electromagnetic wave energy, an electromagnetic wave permeable gas-tight window disposed ni each of said waveguides, a first coating of a material having a secondary electron emission coefficient greater than unity disposed along the lateral surface of said cylindrical element, a second coating of a material having a secondary electron emission coefficient greater than unity and different from the secondary electron emission coefficient of said first coating disposed along the inner lateral surface of said shell, means for providing a magnetic field in a direction parallel to the axis of said element and said shell, means for applying to one of said waveguides an electromagnetic wave of a frequency $f$, said frequency $f$ being related to the radial distance separating said first and second coatings so as to allow electrons to traverse said distance in a time essentially equal to $$\frac{(2n-1)}{2f}$$

where $n$ is a positive integer, a first electrical conductor electrically connected to said element, and a second electrical conductor electrically connected to said shell.

References Cited

UNITED STATES PATENTS 3,201,640   8/1965   Farnsworth.
3,278,865  10/1966   Forrer.

J D MILLER, Primary Examiner

W. H. BEHA, JR., Assistant Examiner

U.S. Cl. X.R.

313—104; 333—83, 98